United States Patent [19]
Nakamura et al.
[11] 4,386,432
[45] May 31, 1983

[54] CURRENCY NOTE IDENTIFICATION SYSTEM

[75] Inventors: Yashushi Nakamura, Yokohama; Ko Ohtombe, Tokyo; Kouji Izawa, Yokohama, all of Japan

[73] Assignee: Tokyo Shibaura Denki Kabushiki Kaisha, Kawasaki, Japan

[21] Appl. No.: 198,169

[22] Filed: Oct. 17, 1980

[30] Foreign Application Priority Data

Oct. 31, 1979 [JP] Japan ............................... 54-139859

[51] Int. Cl.[3] ............................................... G06K 9/00

[52] U.S. Cl. .......................................... 382/7; 382/33; 382/36

[58] Field of Search ................. 340/146.3 Q, 146.3 R, 340/146.3 AC, 825.34, 825.35; 209/534; 194/4 R; 235/375, 425, 438, 491; 382/7, 33, 36

[56] References Cited

U.S. PATENT DOCUMENTS

| | | | |
|---|---|---|---|
| 3,688,267 | 8/1972 | Iijima et al. | 340/146.3 Q |
| 3,727,193 | 4/1973 | Bolie | 340/146.3 Q |
| 3,906,446 | 9/1975 | Iijima et al. | 340/146.3 Q |
| 4,041,456 | 8/1977 | Ott et al. | 340/146.3 Q |
| 4,179,685 | 12/1979 | O'Maley | 340/146.3 R |
| 4,319,221 | 3/1982 | Sakoe | 340/146.3 Q |

FOREIGN PATENT DOCUMENTS 53-146698 12/1978 Japan .

*Primary Examiner*—Leo H. Boudreau
*Attorney, Agent, or Firm*—Schuyler, Banner, Birch, McKie & Beckett

[57] ABSTRACT

This disclosure concerns currency identification systems for examining an authenticity characteristic of a detected currency and comparing it to an authenticity characteristic of a genuine currency to determine if the detected currency is genuine.

The systems comprises memory means for storing a series of first electrical signals representing the authenticity characteristic of the genuine currency, each of the first signals corresponding to a discrete successive area of the genuine currency and representing a component of a first authenticity vector, detecting means for scanning the detected currency and generating a series of second electrical signals representing the authenticity characteristic of the detected currency, each of the second signals corresponding to a discrete successive area of the detected currency and representing a component of a second authenticity vector, calculating means coupled to the detecting means and the memory means to calculate a value of similarity corresponding to an angle between the first authenticity vector and the second authenticity vector, and comparing means for comparing the value of similarity with a predetermined value which represents a permissable authenticity value for the detected currency corresponding to a genuine currency.

6 Claims, 10 Drawing Figures

CURRENCY NOTE IDENTIFICATION SYSTEM

BACKGROUND OF THE INVENTION

This invention relates generally systems for identifying currency, and more particularly to an improved process for identifying a genuine currency note. The increased usage of vending machines, money changers, bank terminal machines etc in recent years has made it necessary to automatically and correctly identify the authenticity of currency notes, and especially bank notes.

The identification of the currency notes is generally done by detecting light reflected from the notes, as described in U.S. Pat. No. 4,179,685. Merely detecting reflected light, however, has the disadvantage of failing to verify the authenticity of the detected note to prevent the acceptance of forged notes. One method which has been developed to verify authenticity by detecting magnetic material, metallic element, or color which is contained in the currency or its printing ink is disclosed in Japanese patent disclosure Nos. 54-4199 and 53-146698 corresponding to United States patent application Ser. No. 969,379, filed Dec. 14, 1978. In these disclosures, the detection of color, magnetic material, or metallic elements is performed by substantially the same process.

For example, in the Japanese patent disclosure No. 54-4199, the analogue detecting signal $S_a$, as shown in FIG. 1A, is obtained by scanning a detected bank note and compared with an analogue standard signal $S_f$, corresponding to a genuine note, to obtain an absolute difference signal $S_g$ (see FIG. 1B). If difference signal $S_g$ remains less, during its entire time interval, than a predetermined level $V_a$, then the detected bank note is considered to be genuine.

If at any instant the difference signal exceeds level $V_a$, the note will be rejected. This method, therefore has disadvantages in that a note having a minor disfigurement due to its handling (i.e., wrinkles) and daily processing will be rejected which otherwise should not occur. These minor disfigurements can be caused by handling which stretch, shrink, and/or fade printing patterns or which decrease the quantity of magnetic material or metallic elements.

In the field of currency identification systems, the printing patterns of the detected objects (i.e. currency notes) are in fixed and standard forms; as a result, the measured difference between the detected note and signals corresponding to a genuine note are generally small. On the other hand, in the field of pattern recognition systems the printing patterns are generally not in fixed and standard forms; variations in the figures or patterns exist which must be recognized and checked for comparison. As a result, the systems circuitry must be sensitive to greater differences between the detected pattern and the known pattern, than is the case with currency note identification systems where greater differences are not tolerated. In the field of pattern recognition, methods are utilized which calculate numerous values of similarity between areas of a detected object and corresponding areas of known object to determine if the detected pattern should be accepted (See U.S. Pat. Nos. 3,688,267 and 3,906,446). This instant invention incorporates same features of pattern recognition to a currency note identification system whereby a novel method and apparatus is employed to calculate a value of similarity between a detected note and a genuine note to determine authenticity. The disadvantages resulting from utilizing the prior art method of comparing an absolute value difference signal to a predetermined level $V_a$ is avoided. Moreover, the time consuming disadvantage of prior art pattern recognition systems of calculating a large number of values of similarity between numerous areas of a detected pattern and corresponding areas of a known pattern is eliminated. The instant invention utilizes pattern recognition techniques wherein, however, a value of similarity between the detected note and the genuine note is employed, rather than numerous values.

SUMMARY OF THE INVENTION

It is one object of this invention to provide a new and improved currency identification system.

It is another object of this invention to provide a currency identification system which can accurately and quickly identify the detected currency.

According to this invention, the foregoing and other objects are obtained by providing a currency identification system for examining an authenticity characteristic of a detected currency and comparing it to an authenticity characteristic of a genuine currency to determine if the detected currency is genuine. The system includes: memory means for storing a series of first electrical signal representing the authenticity characteristic of the genuine currency, each of the first signals corresponding to a discrete successive area of the genuine currency and representing a component of a first authenticity vector, detecting means for scanning the detected currency and generating a series of second electrical signals representing the authenticity characteristic of the detected currency, each of the second signals corresponding to a discrete successive area of the detected currency and representing a component of a second authenticity vector, calculating means coupled to the detecting means and the memory means to calculate the value of similarity corresponding to an angle between the first authenticity vector and the second authenticity vector, and comparing means for comparing the value of similarity with a predetermined value which represents permissible authenticity values for the detected currency.

BRIEF DESCRIPTION OF THE DRAWINGS

The exact nature of this invention, as well as other objects and advantages thereof, will be readily apparent from consideration of the following specification relating to the annexed drawings in which.

DESCRIPTION OF THE PREFERRED EMBODIMENTS

The principles of this invention are explained with reference to FIGS. 2A and 2B. The electrical signal curves S' and V' are shown in FIG. 2A for a genuine and a detected note, respectively. In addition to time, the X-axis indicates that each section of the printing pattern range is divided into N areas and the Y-axis indicates the value of the electrical signal (e.g., $a_1$, $a_2$, . . . ; $b_1$, $b_2$ . . . ) along any point on the area. The electrical signals S' and V' may be electrical analogue signals (as shown in FIG. 2A) generated from light being reflected from a currency note or electrical discrete signals corresponding to a quantity of metallic elements at each area (not shown). In FIG. 2A, the solid line S' shows an electrical analogue signal by scanning a genuine currency note and the dotted line V' shows an electrical analogue signal by scanning a detected currency note. The electrical analogue signal S' is first sampled at N points along the genuine currency note resulting in an electrical signal S'' (See FIG. 2C) consisting of components $a_1$, $a_2$, . . . , $a_N$ which are stored in memory. In practice, these components are obtained and stored in memory before the detected currency is examined. The electrical analogue signal V' is then sampled at N points along the detected currency resulting in an electrical signal series V'', (See FIG. 2C) consisting of components $b_1$, $b_2$, . . . $b_N$. Clearly, if electrical discrete signals are employed, rather than analogue signals, then there is no need to use sampling to obtain the components.

Figure 1B:
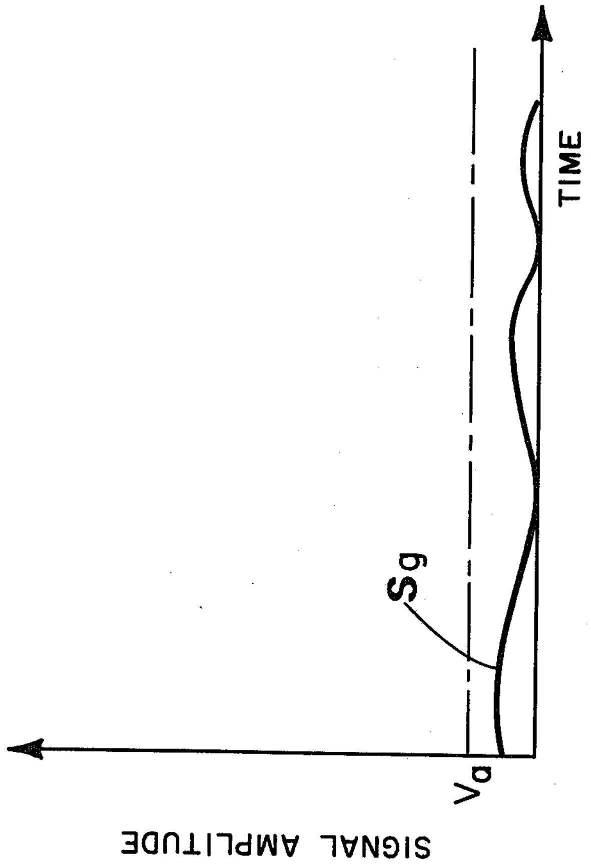
FIG. 1B PRIOR ART
FIG. 1A, 1B shows the waveforms of an analogue detecting signal $S_a$, an analogue standard signal $S_f$, and the difference signal $S_g$ employed in an identification method of the prior art.
Figure 2B:
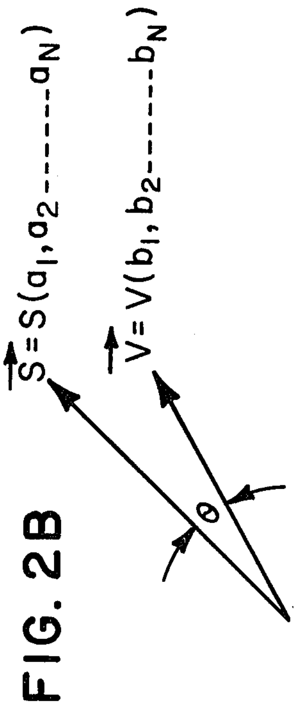
FIG 2B shows vectors $\vec{S}$, $\vec{V}$ where employed in explaining the principles of the instant invention.
Figure 1A:
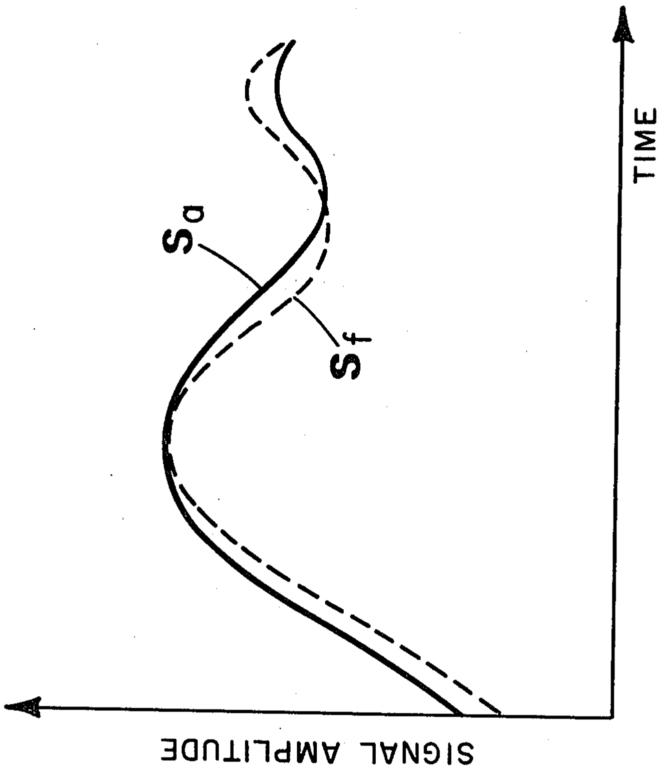
FIG. 1A PRIOR ART
Figure 2A:
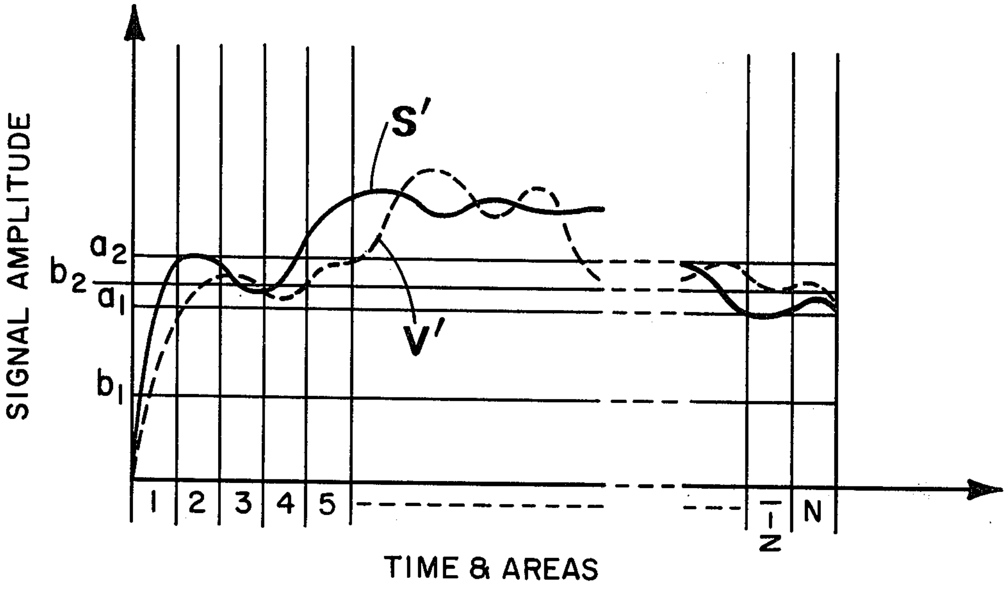
FIGS. 2A, 2C shows waveforms of electrical analogue signals S', V' and S'', V''.
Figure 2C:
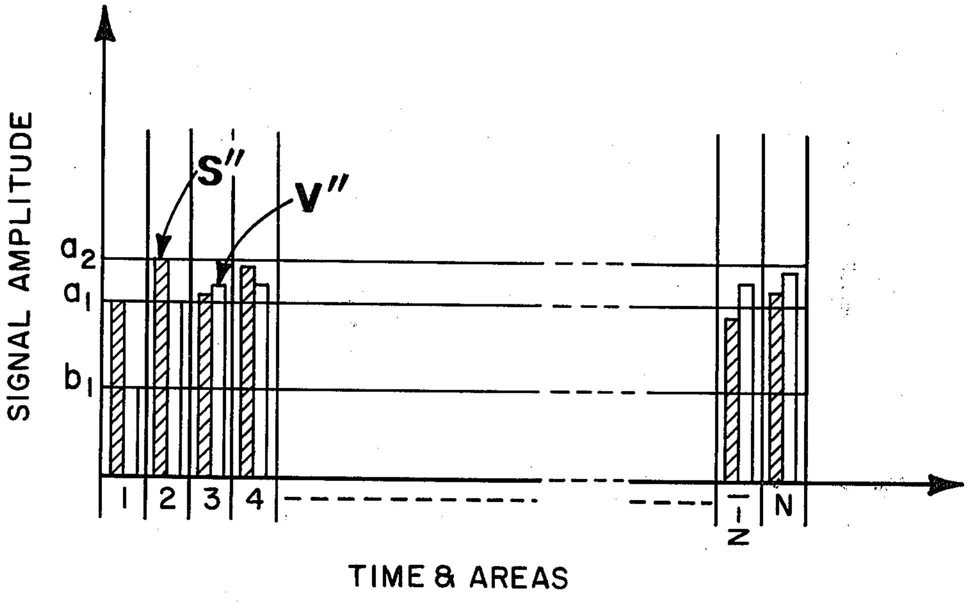

As shown in FIG. 2B, a first authenticity vector $\vec{S}$ is defined as a vector composed of N components in a N dimensional coordinate system, each component corresponding to a respective one of the successive N area signals of S'' shown in FIG. 2C of the genuine currency note. The second authenticity vector $\vec{V}$ is defined as a vector composed of N components in a N dimensional coordinate system, each component corresponding to a respective one of the successive N area signals of V'' shown in FIG. 2C of the detected currency.

In this invention, the angle $\theta$ between the first authenticity vector $\vec{S}$ and the second authenticity vector $\vec{V}$ is examined to obtain a single value of similarity (W) between the signals. One of the following values of similarity can be used: cos $\theta$, sin $\theta$, $\cos^2\theta$ $\sin^2\theta$ etc. In general, COS $\theta$ can be used to represent the value of similarity (W) as shown by the following expression:

$$W = \cos\theta = \frac{\vec{S}\cdot\vec{V}}{|\vec{S}|\cdot|\vec{V}|} = \frac{\sum_{I=1}^{N} S(I)\cdot V(I)}{\sqrt{\sum_{I=1}^{N}\{S(I)\}^2}\cdot\sqrt{\sum_{I=1}^{N}\{V(I)\}^2}}$$

Where S(I) is each component of the sampled genuine currency signal (i.e., S'') and V(I) is each component of the sampled detected currency signal (i.e., V''). When W (i.e., cos $\theta$) is larger than a predetermined permitted value $W_d$, the examined currency note is genuine, where $W_d$ is larger than 0.5 and less than 1.

Figure 3A:
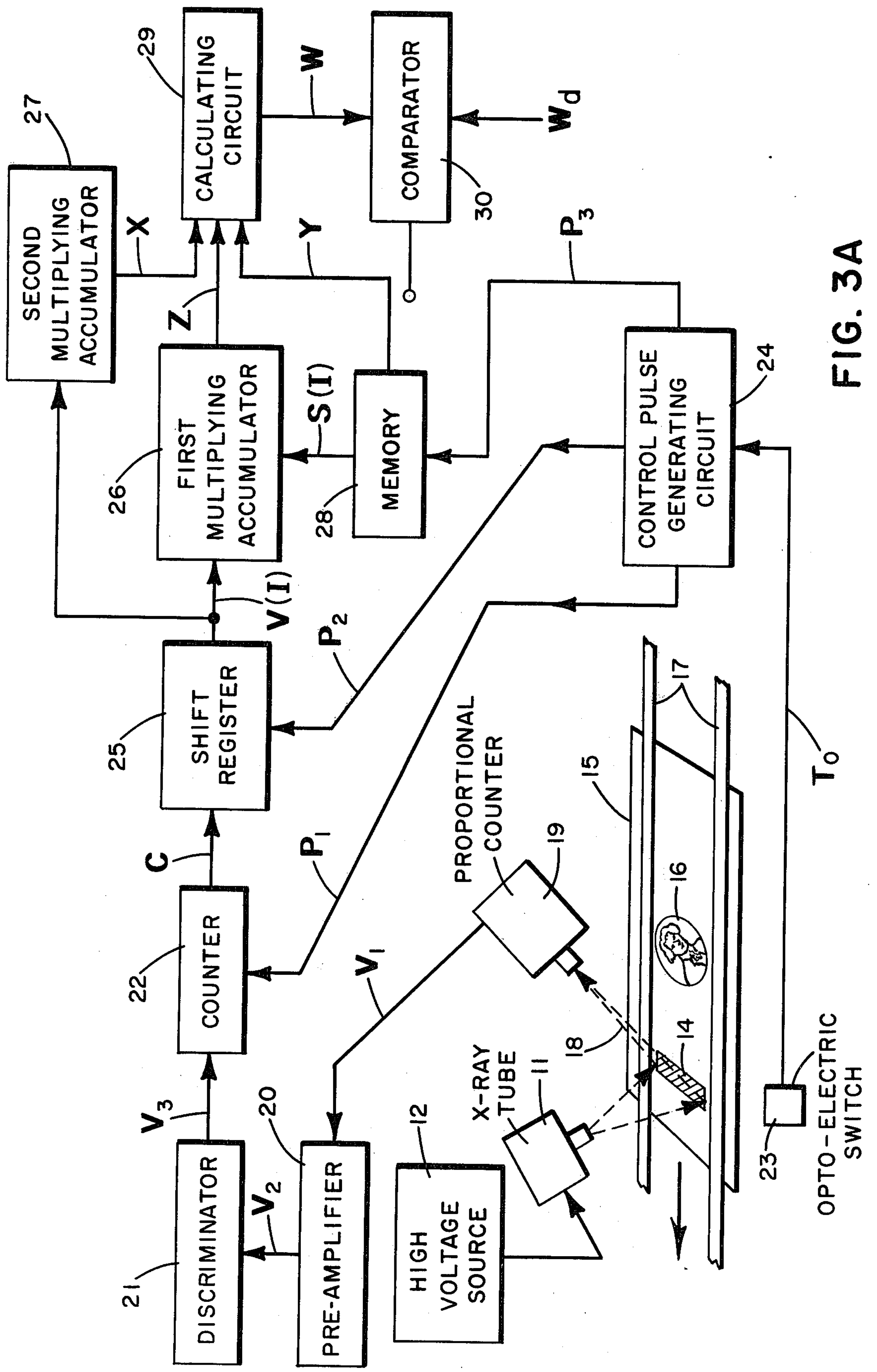
FIG. 3A shows a block diagram of one embodiment of the invention.

FIG. 3A shows a block diagram of one embodiment of the invention for calculating a single value of similarity W to determine authenticity. A X-rays tube 11 receiving electrical power from a high voltage source 12 generates x-rays 13 in a predetermined area 14 for irradiating a detected currency note 15. The printing ink used in forming printing pattern 16 on the note contains one metallic element such as $Z_n$, this element is distributed on the currency note 15 corresponding to the printing pattern. The currency note 15 is conveyed at a uniform speed, in the direction shown, by the conveying belts 17. When the printing pattern 16 pass through area 14, a fluorescent X-ray 18 is generated by the reflection of x-rays 13 from the metallic element. Namely, fluorescent X-ray 18 has the following relation, $E=hc/\lambda$ (where E=Energy, h=Plank's constant, $\lambda$=wavelength, c=electromagnetic wave speed). The wavelength $\lambda$ of fluoroescent X-ray 18 depends upon the type of metallic elements contained in the printing ink, and the intensity of X-ray 18 is proportional to the quantity of the metallic elements.

Upon detecting X-ray 18 and converting it to electrical pulses, the quantity and type of the metallic elements can be obtained. That is, the waveheight of the detected pulses corresponds to the type of metallic element and the number of detected pulses is proportional to the quantity present. Therefore, by measuring the pulse waveheight, the type of elements contained in the currency note can be detected; by counting the number of pulses, the quantity of the elements can be detected.

As shown in FIG. 3A, fluorescent X-ray 18 is detected by a proportional counter 19. Proportional counter 19 converts fluorescent X-ray 18 to electrical pulse signals $V_1$, and supplies these signals to a preamplifier 20. Pre-amplifier 20 amplifies the electrical pulse signals $V_1$ to signals $V_2$ and then supplies this amplified signal to a discriminator 21. The characteristic of discriminator 21 is such that only pulse signals having a predetermined height are permitted to pass (i.e. signals $V_3$). That is, discriminator 21 has an upper and lower limit wherein only pulses having a height between the upper and lower limit are permitted to pass. The upper and lower limit are set to permit passage of signals which have a height corresponding to the particular metallic element (e.g., Zn). The electrical pulse signals $V_3$ are supplied to a counter 22 (e.g., an 8 bit counter) for counting the number of pulses per area.

Figure 3B:
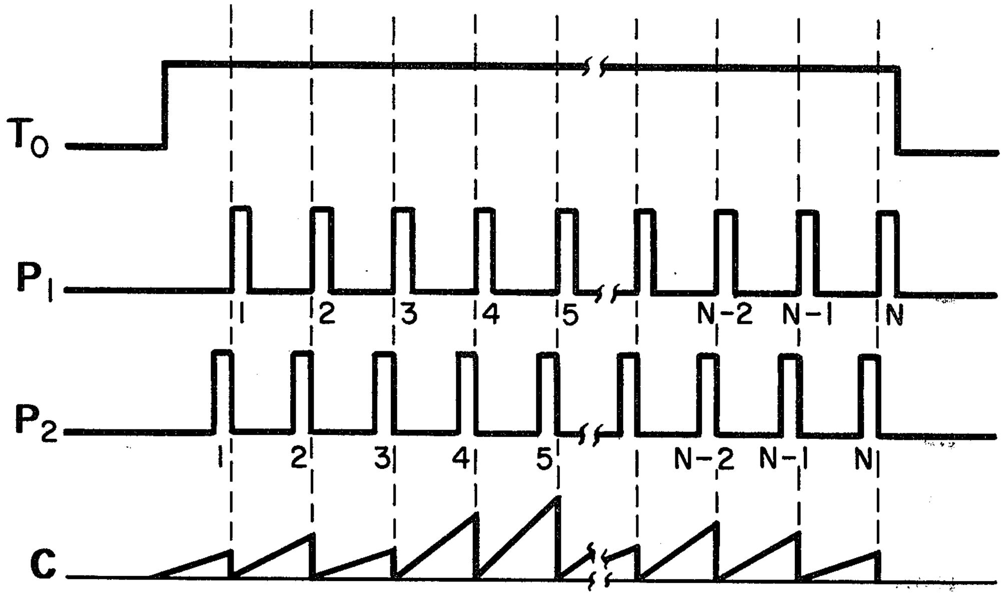
FIG. 3B shows a series of waveforms for explaining the embodiment of FIG. 3A.

As the detected notes passes through the X-ray detection system, its beginning edge and its terminal edge are detected by an opto-electric switch 23. The edge detection signal $T_o$ is supplied to a control pulse generating circuit 24. As shown in FIGS. 3A and 3B, circuit 24 generates a counter clear pulse $P_1$, a shift register timing pulse $P_2$ and a timing control signal $P_3$ based on edge detection signal $T_o$. The counter clear pulses $P_1$ comprises N pulses at regular intervals for clearing counter 22 N times during the time interval when the currency note 15 is being scanned. Each $P_1$ pulse corresponds to a discrete successive area of the detected note. As a result, a count number C corresponding to the quantity of element $Z_n$ (for example) at each of N areas is obtained in counter 22. Shift register timing pulses $P_2$ are supplied to a shift register 25 immediately before counter clear pulse $P_1$ is supplied to counter 22; consequently, the counted value C is set in shift register 25. A quantity of element $Z_n$ at each of N areas, of the detected currency note 15, namely each component V(I) of second authenticity vector $\vec{V}$ (i.e., V(1), V(2) . . . V (N−1), V (N)), is successively supplied from shift register 25 to a first multiplying accumulator 26 and a second multiplying accumulator 27.

A read only memory (ROM) 28 is programmed to store values representing the particular quantity of $Z_n$ elements at each of the N areas of a genuine currency note, namely each component S(I) of first authenticity vector $\vec{S}$ (i.e., S(1), S(2), . . . S(N−1), S(N)). The memory also contains the value Y, where $$Y = \sum_{I=1}^{N} \{S(I)\}^2;$$

a necessary value in calculating the value of similarity. In response to a timing control signal $P_3$, memory 28 successively supplies each component S(I) of first authenticity vector $\vec{S}$ to first multiplying accumulator 26. First multiplying accumulator 26 calculates Z, where $$Z = \sum_{I=1}^{N} \vec{V}(I) \cdot S(I).$$

In particular, first multiplying accumulator 26 calculates $Z_1 = V(1) \cdot S(1)$ when V(1) is supplied from shift register 25 and S(1) is supplied from memory 28 and calculates $Z(2) = V(2) \cdot S(2) + V(1) \cdot S(1)$ when V(2) is supplied from shift register 25 and S(2) is supplied from memory 28. Circuit 26 continues this series of operations until all N values for V(I) and V(N) are received, multiplied together, and summed to calculate Z. Second multiplying accumulator 27 calculates X, where $$X = \sum_{I=1}^{N} \{\vec{V}(I)\}^2.$$

In particular, second multiplying accumulator 27 calculates $X_1 = \{V(1)\}^2$ when V(1) is supplied from shift register 25 and calculates $X_2 = \{V(2)\}^2 + \{V(1)\}^2$ when V(2) is supplied from shift register 25. Circuit 27 continues this series of operations until all N values for V(I) are received, squared and summed to calculate X.

The values X, Z and Y are supplied to a calculating circuit 29 which functions to extract square roots, multiply, and divide to calculate the value of similarity W, where $$W = \frac{Z}{\sqrt{X} \cdot \sqrt{Y}}.$$

As discussed previously regarding FIG. 2B, the angle θ between vectors $\vec{V}$ and $\vec{S}$ is examined to calculate the value of similarity (i.e., cos θ). This value, calculated by circuit 29, is supplied to a comparator 30. Comparator 30 compares the value of similarity W with the predetermined permitted value $W_d$, wherein $0.5 < Wd < 1$. If W is larger than $W_d$, the output level of comparator 30 is high, indicating that the detected currency note 15 is genuine.

The invention eleminates the adverse readings caused by minor disfigurements due to handling and daily processing since numerous components are not compared to obtain numerous values of similarity. Rather, two vectors are compared which are formed of the various components. As previously discussed, the value of similarity depends on the angle θ between first authenticity vector $\vec{S}$ and second authenticity vector $\vec{V}$, and is independent of each vector's length. Therefore, even if some components V(I) of second authenticity vector $\vec{V}$ is substantially greater or less than corresponding components S(I) of first authenticity vector S, rejection of a genuine note can be prevented.

In the embodiment shown FIG. 3A, the quantitative distribution of $Z_n$ is detected. But it is possible to detect other metallic elements such as $F_e$, $C_u$, $P_b$, $C_r$. Also, it is possible to identify by detecting a pluarility of metallic elements which may be contained in the detected currency note.

In the embodiment of FIG. 3A, an angle between first authenticity vector $\vec{S}$ and second authenticity vector $\vec{V}$ is examined. Alternatively, however, if $$\vec{V}(I) - \sum_{I=1}^{N} \frac{\vec{V}(I)}{N}$$

is substituted for V(I) in the previous expression and $$S(I) - \sum_{I=1}^{N} \frac{S(I)}{N}$$

is substituted for S(I), a better method for examining authenticity is possible. Moreover, rather than using a single detector as shown in FIG. 3A, several arrayed detectors can be positioned along the currency notes. In this case, a signal obtained from each detector would correspond to each component of vector $\vec{V}$.

Figure 4:
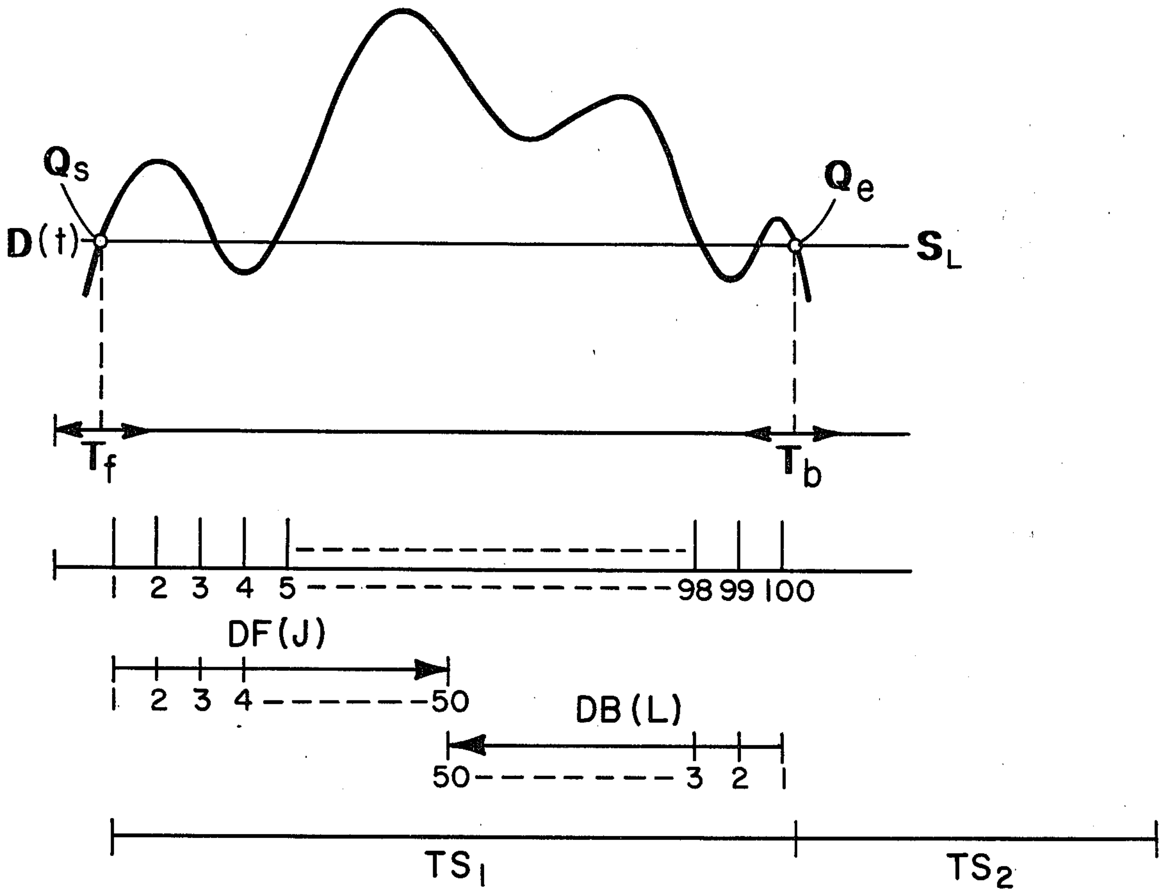
FIG. 4 shows a schematic view for explaining a further embodiment of the invention.

FIG. 4 discloses the principle of a further embodiment which detects the printing pattern as the authenticity characteristic. Moreover, rather than calculating a single value of similarity as disclosed in the previous embodiment, two values of similarity are calculated. D(t) corresponds to a photo-electro analogue signal produced by scanning a detected currency note, $Q_s$ corresponds to the beginning of the printing pattern while $Q_e$ corresponds to the end of the printing pattern. $Q_s$ and $Q_e$ are the points in which D(t) crosses a predetermined level $S_1$ during predetermined time area signals $T_f$, $T_b$. Various methods can be used in order to detect $Q_s$ and $Q_e$. For example, it is possible to use the beginning of the currency note and the terminal end of the currency note, respectively. The area between $Q_s$ and $Q_e$ is divided into N areas (e.g., 100 areas), and analogue signal D(t) is sampled by a sampling signal $T_1$, shown in FIG. 4 to give amplitude values D(I). Sampled signal D(I) at each sampling point is then divided into a first and second series DF(J) and DB(L). Each of these signal series are used to calculate a value of similarity. Series DF(J) begins with the first area and the other series DB(L) begins with the last Nth area. Each of these series terminates with the mean value of N (e.g., 50, where N=100). Series DB(L) is obtained by successively storing all the amplitude values of series D(I) and then reading out these values in reverse order. Namely, during a time interval $TS_1$, a first value of similarity $W_f$ is calculated from first series DF(J) (F=1, . . . , 50) while second series DB(L) is stored into a memory. During a interval $TS_2$, second series DB(L) (L=1, . . . , 50) is read out in reverse order from the memory and a second value of similarity $W_b$ is then calculated. In this embodiment, a detected currency note is scanned once and the resultant electrical signal is divided into two signal series DF(J), DB(L). Alternatively, the two signal series can be obtained by scanning the note twice; scanning first to obtain the first series and then varying the orientation of the note and then scanning it again to obtain the second series.

Assume two series SF(J) (J=1, . . . , 50), SB(L) (L=1, . . . , 50) have been obtained by scanning a genuine currency note in a manner similar to obtaining series DF(J) and DB(L), as discussed above, and then storing these signals in memory. A first value of similarity $W_f$ beginning with the first area of a detected note and a second value of similarity $W_b$ beginning with the last Nth area of the detected note can then be obtained as follows;

$$W_f = \frac{\sum_{J=1}^{50} DF(J) \cdot SF(J)}{\sqrt{\sum_{J=1}^{50} \{DF(J)\}^2} \cdot \sqrt{\sum_{J=1}^{50} \{SF(J)\}^2}}$$

$$W_b = \frac{\sum_{L=1}^{50} DB(L) \cdot SB(L)}{\sqrt{\sum_{L=1}^{50} \{DB(L)\}^2} \cdot \sqrt{\sum_{L=1}^{50} \{SB(L)\}^2}}$$

Upon obtaining the two values of similarity there are various methods to identify a genuine currency by comparing these values with a predetermined value representing a permissible authenticity value. In one method, when both $W_f$ and $W_b$ are larger than the predetermined permitted value (e.g., 0.6) it is thereby determined that the detected currency note is genuine. With the other method, when the mean value $W=(W_f+W_b)/2$ is larger than the predetermined permitted value, it is thereby determined that the detected currency note is genuine.

Figure 5A:
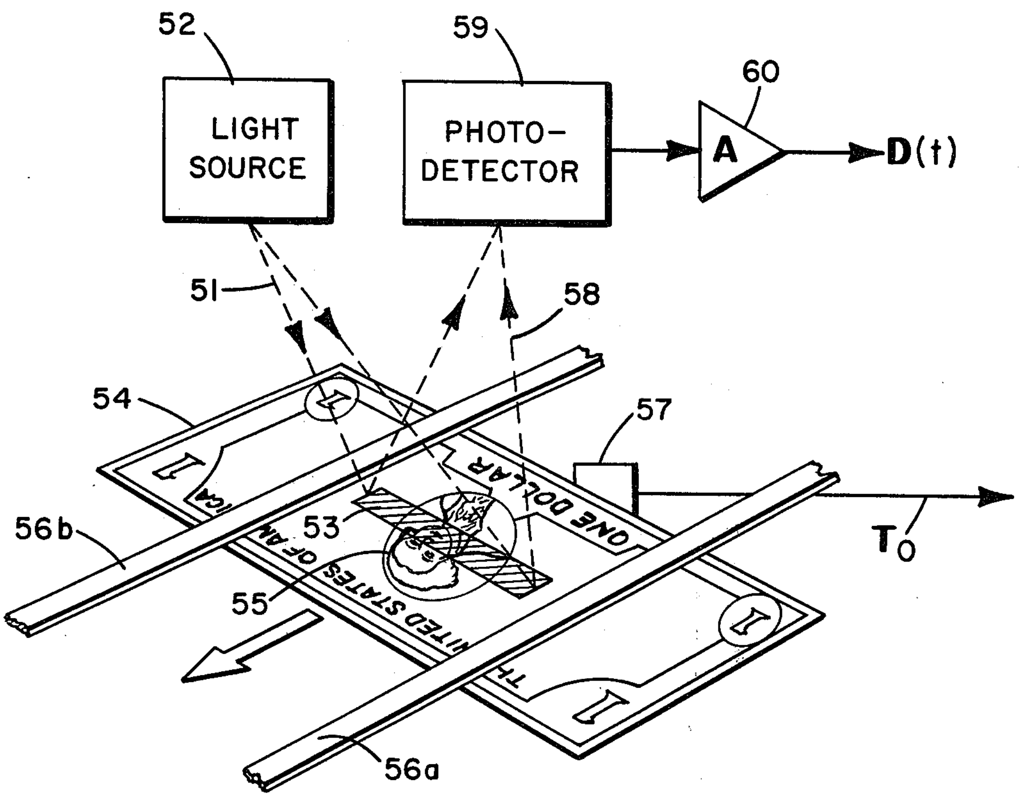
FIG. 5A shows a perspective view of the characteristic detecting part of the embodiment of the invention shown in FIG. 4.
Figure 5B:
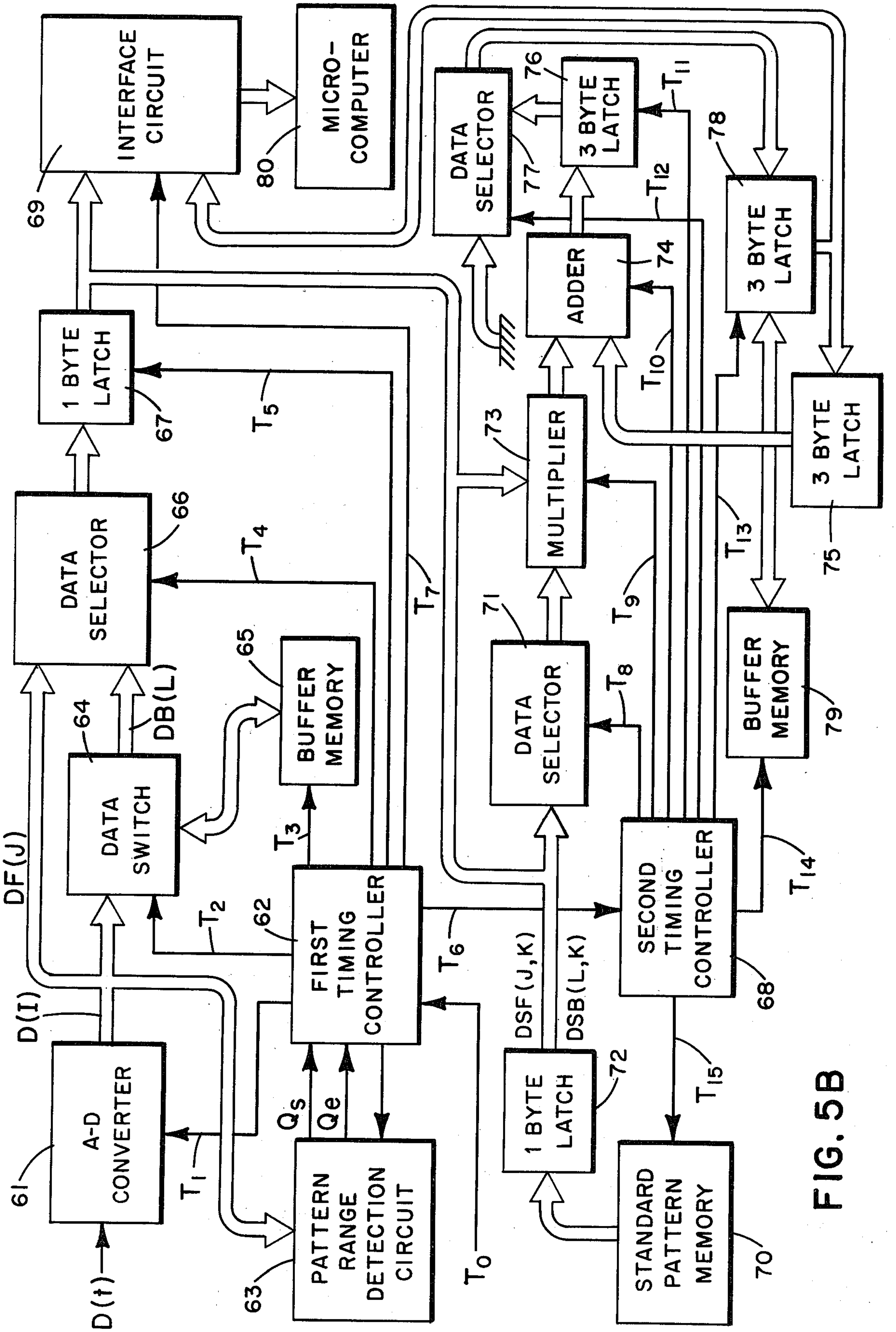
FIG. 5B shows a block diagram of the embodiment of the invention shown in FIGS. 4 and 5A.

The embodiment shown in FIGS. 5A and 5B incorporates the methods discussed above regarding FIG. 4. In this embodiment five types of currency notes (e.g., one-dollar bills, five-dollar bills, ten-dollar bills, twenty dollar bills and fifty-dollar bills) are acceptable in which first and second values of similarity are obtained for each note (eg., $W_{f1} \ldots W_{f5}$ and $Wb_1 \ldots Wb_5$). FIG. 5A shows a schematic view of the mechanism for detecting an authenticity characteristic of a printing pattern on the currency note. A light 51 from light source 52 illuminates a predetermined area 53 on the detected note currency 54. Detected note 54 has a printing pattern 55 and is conveyed with uniform speed in the direction shown by conveying belts 56*a*, 56*b*. A photoelectric switch 57 detects the beginning edge and the terminal edge of the detected currency note 54 and generates an edge detection signal $T_o$. The light 58 reflected by currency note 54 is converted into electrical signal in a photo detector 59 and are then amplified by an amplifier 60 to produce analogue electrical signal D(t).

As shown in FIG. 5B, electrical signal D(t) is supplied to an AD converter 61 and the edge detection signal $T_o$ is supplied to a first timing controller 62. AD converter 61 receives sampling signals $T_1$ from a first timing controller 62 to produce sampled amplitude value series D(I). A pattern range detecting circuit 63 (e.g., Schmitt-Trigger) supplies signals $Q_s$ and $Q_e$ to first timing controller 62. A data switch 64 supplies signal D(I) to a 128 byte buffer memory 65 and a data selector 66 under the condition of a control signal $T_2$. That is, during time interval $TS_1$ (See FIG. 4), data signal D(I) is stored in buffer memory 65 under the condition of a control signal $T_3$; during time interval $TS_2$ data signal D(I) stored in buffer memory 65 is supplied, as electrical signal series DB(L), to a data selector 66 through data switch 64). Data selector 66 receives signal series DF(J) from AD converter 61 supplies this signal series during time interval $TS_1$ to a 1 byte latch 67 for temporarily storing DF(J). Selector 66 also supplies electrical signal series DB(L) during time interval $TS_2$ to 1 byte latch 67. Data selector 66 and 1 byte latch 67 are controlled by control signals $T_4$, $T_5$ from first timing controller 62. First timing controller 62 also supplies control signals $T_6$, $T_7$ to a second timing controller 68 and to an interface circuit 69.

Calculation of the first value of similarity $W_f$ is performed during time interval $TS_1$. The types of standard pattern data DSF(J,K) and DSB(L,K) (where K=1, . . . 5) corresponding to printing patterns of the various genuine currency notes (e.g., five types) are stored in a standard pattern memory 70 and the signal series $$\sum_{J=1}^{50} \{DSF(J,K)\}^2 \text{ and } \sum_{L=1}^{50} \{DSB(L,K)\}^2$$

are stored in microcomputer 80. When the electrical signal series DF(J) (J=1, . . . , 50) is supplied to a data selector 71 from 1 byte latch 67, the five type of standard pattern signals DSF(J,K) (J=1, . . . , 50) (K=1, . . . , 5) are supplied from pattern memory 70 to the data selector 71 through a 1 byte latch 72. The data selector 71 alternatively supplies electrical signal series DF(J) and standard pattern signals DSF (J,K) to a multiplier 73 under the condition of a control signal $T_8$ from second timing controller 68. Multiplier 73 calculates $(DF(J))^2$ and {DF(J)·DSF(J,K)} under the condition of a control signal $T_9$ from second timing controller 68. The output of multiplier 73 is suplied to an adder 74. Adder 74 adds the output of multiplier 73 to the output of a 3 byte latch 75; the resultant output is supplied to a 3 byte latch 76. Latch 75 contains the results of a previous calculation which was stored in buffer memory 79, as will be discussed. The output of 3 byte latch 76 is supplied to a data selector 77. Data selector 77 selects the output of 3 byte 76 or a clear signal; the output signal is then supplied to a 3 byte latch 78. The output of 3 byte latch 78 is stored in a buffer memory 79.

When multiplier 73 produces a new output, based upon the receipt of new data, and is supplied to adder 74, the previous data stored in buffer memory 79 is supplied to 3 byte latch 75 through 3 byte latch 78. This previous data is then summed in adder 74 with the new data output from multiplier 73. A clear signal is then supplied to buffer memory 79 through 3 byte latch 78. Next, the new data received from 3 byte latch 75 and multiplier 73 which is summed by adder 74 is then stored in buffer memory 79 through latch 76, selector 77 and latch 78, as discussed previously. Namely, adder 74 calculates the sum of $$\sum_{J=1}^{j-1} \{DF(J)\}^2 \text{ and } \{DF(j)\}^2,$$

and the sum of $$\sum_{J=1}^{j-1} \{DF(J) \cdot DSF(J,k)\} \text{ and } \{DF(j) \cdot DSF(j,k)\}$$

$$\sum_{J=1}^{j-1} \{DF(J)\}^2 \text{ and } \sum_{J=1}^{j-1} \{DF(J) \cdot DSF(J,k)\}$$

represents the previous data, while $\{DF(j)\}^2$ and $\{DF(j) \cdot DSF(j,k)\}$ represents the new data. Then $$\sum_{J=1}^{j} \{DF(J)\}^2 \text{ and } \sum_{J=1}^{j} \{DF(J) \cdot DSF(J,k)\}$$

are stored in buffer memory 79. Finally, $$\sum_{J=1}^{50} \{DF(J)\}^2 \text{ and } \sum_{J=1}^{50} \{DF(J) \cdot DSF(J,k)\}$$

are supplied to microcomputer 80 through interface circuit 69. Microcomputer 80 calculates the first value of similarity relating to a one-dollar bills $W_{f1}$ etc. as follows:

$$W_{f1} = \frac{\sum_{J=1}^{50} \{DF(J) \cdot DSF(J,1)\}}{\sqrt{\sum_{J=1}^{50} \{DF(J)\}^2} \cdot \sqrt{\sum_{J=1}^{50} \{DSF(J,1)\}^2}}$$

Likewise, the values of similarity relating the remaining bills are calculated. That is, $W_{f2}$, $W_{f3}$, $W_{f4}$, $W_{f5}$ are calculated.

Calculating the second value of similarity occurs as follows. During time interval $TS_2$, the second series DB(L) read out from buffer memory 65 is supplied to 1 byte latch 67 through data switch 64 and data selector 66. Second series DB(L) ($L=1, \ldots, 50$) is supplied to data selector 71, multiplier 73, and interface circuit 69 from 1 byte latch 67. Multiplier 73 calculates $\{DB(L)\}^2$ and $\{DB(L) \cdot DSB(L,K)\}$ under the condition of a control signal $T_9$ from second timing controller 68. Adder 74 calculates the sum of $$\sum_{L=1}^{l-1} \{DB(L)\}^2 \text{ and } \{DB(l)\}^2 \text{ and the sum of}$$

$$\sum_{L=1}^{l-1} \{DB(L) \cdot DSB(L,k)\}$$

and $\{DB(l) \cdot DSB(l,k)\}$ in a manner disclosed previous regarding DF(J). Finally, $$\sum_{L=1}^{50} \{DB(L)\}^2 \text{ and } \sum_{L=1}^{50} \{DB(L) \cdot DSB(L,K)\}$$

are supplied to microcomputer 80 through interface circuit 69. Microcomputer 80 calculates the second value of similarity relating to the one-dollar bills, five dollar bills, ten-dollar bills, twenty dollar bills, and fifty dollar bills. That is, similarity values $W_{b1}$, $W_{b2}$, $W_{b3}$, $W_{b4}$, $W_{b5}$ are calculated in microcomputer 80. For example, the second value of similarity relating to a fifty dollar bill (i.e. $W_{b5}$) is as follows:

$$W_{b5} = \frac{\sum_{L=1}^{50} \{DB(L) \cdot DSB(L,5)\}}{\sqrt{\sum_{L=1}^{50} \{DB(L)\}^2} \cdot \sqrt{\sum_{L=1}^{50} \{DSB(L,5)\}^2}}$$

Finally, microcomputer 80 calculates $W_k = (W_{fk} + W_{bk})/2$, where $k = 1, \ldots, 5$. The computer then determines whether each value of $W_k$ is larger than the predetermined permitted value (e.g., 0.6). If each value is larger than 0.6, the $W_k$ nearest to 1.0 is selected. For example, if the $W_k$ value nearest to 1.0 is $W_2$, it is concluded that the detected currency note is genuine five-dollar bill. If each value of $W_k$ is less than 0.6, it is then determined that the detected currency note is a false currency note.

In the embodiment shown FIG. 5A detection is performed by detecting the authencity characteristic of a printing pattern by reflected light. It should be clear that other methods can be used, such as detecting by fluorescent X-ray, or by magnetic lines of force.

We claim:

1. A currency identification system for examining an authenticity characteristic of a detected currency and comparing it to an authenticity characteristic of a genuine currency to determine if the detected currency is genuine comprising:

memory means for storing a first and second series of first electrical signals representing the authenticity characteristics of said genuine currency, said first series of first electrical signals each corresponding to a discrete successive area of said genuine currency from one end, said second series of first electrical signals each corresponding to a discrete successive area of said genuine currency from another end, the electrical signals of said first series representing a component of a first genuine authenticity vector and the electrical signals of said second series representing a component of a second genuine authenticity vector;

detecting means for scanning said detected currency and generating a first and second series of second electrical signals representing the authenticity characteristic of said detected currency, said first series of second electrical signals each corresponding to a discrete successive area of said detected currency from one end, said second series of second electrical signals each corresponding to a discrete successive area of said detected currency from another end, the electrical signals of said first series representing a component of a first detected authenticity vector and the electrical signals of said second series representing a component of a second detected authenticity vector;

calculating means coupled to said detecting means and said memory means to calculate a first and second value of similarity, said first value of similarity corresponding to a first angle between said first genuine authenticity vector and said first detected authenticity vector, said second value of similarity corresponding to a second angle between said second genuine authenticity vector and said second detected authenticity vector; and comparing means for comparing the first and second values of similarity with a predetermined value which represents a permissible value for the detected currency corresponding to a genuine currency.

2. A system as in claim 1, wherein said detecting means comprises:

means for irradiating X-rays on said detected currency, containing at least one metallic element corresponding to its authenticity characteristic, for generating fluorescent X-rays;

X-ray detecting means for detecting the fluorescent X-rays generated from the irradiated currency and producing a series of pulses;

pulse height detecting means for detecting the type of said metallic element by measuring the pulse height of said pulses; and, pulse number detecting means for detecting the quantity of said metallic element at each said successive area, said pulse number means counting the number of said pulses and producing said second electrical signals in accordance with said count.

3. A system of claim 1, wherein said memory means further stores signals $Y_f$ and $Y_b$ wherein $$Y_f = \sum_{J=1}^{N} \{SF(J)\}^2 \text{ and } Y_b = \sum_{L=1}^{N} \{SB(L)\}^2,$$

said calculating means comprises a first multiplying accumulator for calculating $Z_f$ and $Z_b$ wherein $$Z_f = \sum_{J=1}^{N} DF(J) \cdot SF(J) \text{ and } Z_b = \sum_{L=1}^{N} DB(L) \cdot SB(L),$$

and a second multiplying accumulator for calculating $X_f$ and $X_b$ wherein $$X_f = \sum_{J=1}^{N} \{DF(J)\}^2 \text{ and } X_b = \sum_{L=1}^{N} \{DB(L)\}^2,$$

where SF(J) represents said first series of first electrical signals, SB(L) represents said second series of first electrical signals, DF(J) represents said first series of second electrical signals and DB(L) represents said second series of second electrical signals;

and said calculating means further comprises a similarity calculating circuit means for calculating the value of similarity W wherein $$W_f = \frac{Z_f}{\sqrt{X_f} \cdot \sqrt{Y_f}},\ W_b = \frac{Z_b}{\sqrt{X_b} \cdot \sqrt{Y_b}},$$

$$\text{and } W = (W_f + W_b)/2.$$

4. A system of claim 1, wherein said detecting means comprises:

scanning means for scanning the detected currency in a predetermined direction to produce reflected light corresponding to the authenticity characteristic of said detected currency;

authenticity detecting means for detecting the reflected light and producing an analogue detected signal;

sampling means, receiving said analogue detected signal, for producing said second electrical signals corresponding to said discrete successive areas from a first area to a Nth area, on said detected currency, said sampling means containing means to produce said first and second series wherein said first series begins with said first area and the second series begins with said Nth area.

5. A system of claim 4, wherein each of said first series and second series terminates with the mean value of the Nth area.

6. A currency identification method for examining an authenticity characteristic of a detected currency and comparing it to an authenticity characteristic of a genuine currency to determine if the detected currency is genuine comprising the steps of:

storing a first and second series of first electrical signals representing the authenticity characteristic of said genuine currency, said first series of first electrical signals each corresponding to a discrete successive area of said genuine currency from one end, said second series of first electrical signals each corresponding to a discrete successive area of said genuine currency from another end, the electrical signals of said first series representing a component of a first genuine authenticity vector and the electrical signals of said second series representing a component of a second genuine authenticity vector;

scanning said detected currency and generating a first and second series of second electrical signals representing the authenticity characteristic of said detected currency, said first series of second electrical signals each corresponding to a discrete successive area of said detected currency from one end, said second series of second electrical signals each corresponding to a discrete successive area of said detected currency from another end, the electrical signals of said first series representing a component of a first detected authenticity vector and the electrical signals of said second series representing a component of a second detected authenticity vector;

calculating a first and second value of similarity, said first value of similarity corresponding to a first angle between said first genuine authenticity vector and said first detected authenticity vector, said second value of similarity corresponding to a second angle between said second genuine authenticity vector and said second detected authenticity vector; and comparing the first and second values of similarity with a predetermined value which represents a permissible authenticity value for the detected currency corresponding to a genuine currency.

* * * * *